INVENTOR.
FREDERICK W. KAVANAGH

May 17, 1955
F. W. KAVANAGH
2,708,389
SPECTRAL WEDGE INTERFERENCE FILTER
COMBINED WITH PURIFYING FILTERS
Filed Jan. 9, 1951
2 Sheets-Sheet 2
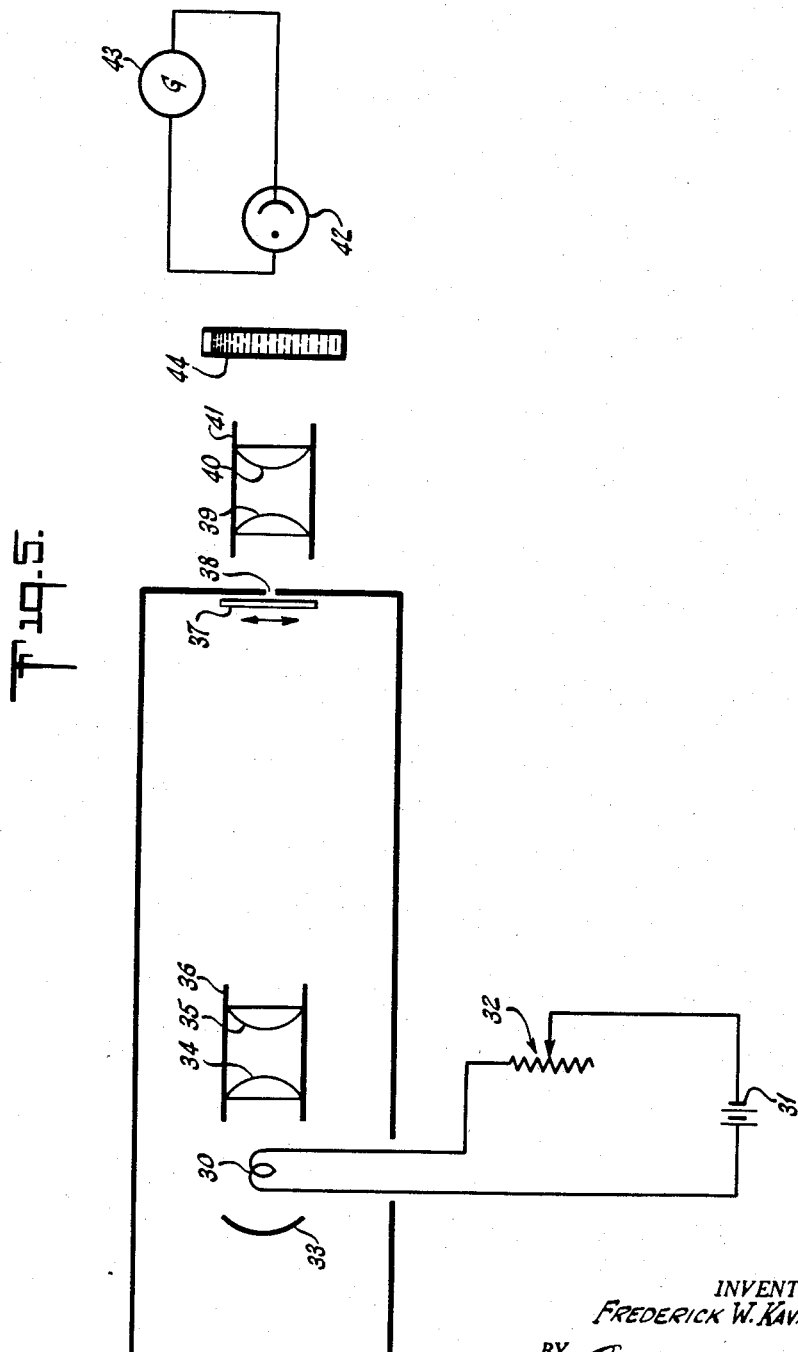
INVENTOR.
FREDERICK W. KAVANAGH
BY
ATTORNEYS United States Patent Office 2,708,389
Patented May 17, 1955

2,708,389

SPECTRAL WEDGE INTERFERENCE FILTER COMBINED WITH PURIFYING FILTERS

Frederick W. Kavanagh, New York, N. Y.

Application January 9, 1951, Serial No. 205,097

4 Claims. (Cl. 88—112)

This invention relates to spectroscopic apparatus and more particularly to spectrometers and spectrum producing means therefor.

Spectrometers, whether of the type used to analyze the character of radiation passing through the instrument or to produce light of a given wavelength or band of wavelengths, must necessarily employ a spectrum producing element such as a prism to form a spectrum of the source. In the case where it is desired to produce a very narrow band of wavelengths of light for the purpose of determining certain characteristics of transparent or semi-transparent substance, a photovoltaic or photo emissive cell including an amplifier and suitable indicating means is used to determine the amount of light of a given wavelength that is transmitted through the substance or specimen.

One of the major problems encountered with spectroscopic apparatus is the large loss of light that naturally results when the source is dispersed. The optical system including the spectrum producing means and focusing elements must therefore be carefully selected to secure high light transmission characteristics. To this end most spectroscopes employ a prism as a dispersing means because it will break down a source of light into a single spectrum with the least amount of undesired scattered light and for this reason the prism surpasses the efficiency of an optical grating which produces a number of spectral images of which one must be selected and the remainder carefully filtered out to avoid undesirable interference.

The prism, however, at best is very inefficient and requires the use of collimator lenses of good quality on each side of the prism or equivalent optical system to receive a source of light from a carefully formed slit and focus the image of the spectrum produced by the prism on an exit slit. Thus the lenses must not only have good transmission characteristics but must also form a substantially perfect image on the exit slit.

The prism, although preferred to other light dispersing means for spectroscopic apparatus, produces a non-linear spectrum with substantial crowding of the red end of the spectrum. Furthermore, both the prism and the grating as spectrum producing means must be fairly large in order to secure adequate light. For prism operation beyond the visible range of the spectrum, quartz, within its range, is most desirable. The availability of large quartz crystals constitutes a serious limitation however. Similarly, large gratings are exceedingly difficult to make and are therefore quite expensive.

From the above it is apparent that an instrument having a reasonable light transmission efficiency must necessarily employ the highest quality optical elements and apparatus and materially increases the cost of even a simple device.

The invention contemplates spectroscopic apparatus that overcomes most of the inherent defects of both the prism and the grating and attains a very much higher light transmission efficiency. Moreover, with apparatus according to the invention, the reproduced spectrum may be entirely linear and the spectrum is formed directly without the need of any image forming lenses. In cases where it is desirable to produce light of a given wavelength or band of wavelengths, it is not necessary to use an entrance slit or to form an image of any entrance slit or even the filament of the light source on the exit slit. In the high grade instruments of this character that employ the prism the exit slit is frequently curved since the image of the entrance slit is curved by the optical system and therefore the exit slit must coincide therewith for optimum results.

Prism type instruments of the above type are generally restricted to sources of light of the order of 50 to 100 watts and the light emanating from the exit slit is usually of such low intensity that extremely sensitive electrical indicating instruments are required. Instability and noise level of electronic devices usually used to obtain higher sensitivity place a serious limitation on the ultimate sensitivity attained. With applicant's invention it is possible to operate with light sources of the same order and obtain sufficient light at any given wavelength to actuate a light recording or indicating means consisting of a relatively sensitive galvanometer connected directly with a photovoltaic cell and obtain equivalent sensitivities.

These ends are accomplished with the invention by the use of a wedge interference transmission filter to isolate particular wavelengths of light directly and without the formation of slit images. The invention further contemplates the correction of wedge interference filters of wide band pass characteristics by the application of suitable color filters to the surface of the transmission interference filter so that auxiliary filtering means normally required by conventional instruments to applicant's knowledge are completely obviated.

Another important aspect of the invention is that the range over which it may be operated is considerably greater than the normal ranges to which conventional instruments are limited. With the transmission filter in accordance with the invention it is possible to isolate wavelengths in both the infra-red and ultra-violet portions of the spectrum far beyond the visible range, so that with the substitution of a suitable source of light to provide the ultra-violet or infra-red wavelengths and co-operating detectors, it is possible to obtain results in those wavelength regions equivalent to the results obtainable within the visible portion of the spectrum.

The above and other objects of the invention will become more apparent from the description and accompanying drawings forming part of this application.

In the drawings—

Fig. 5 is a diagrammatic view of a spectroscopic apparatus in accordance with the invention.

Figure 1:
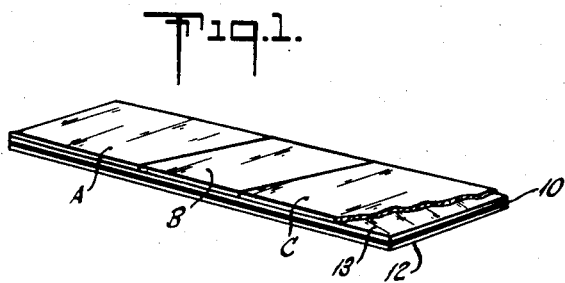
Fig. 1 is a perspective view of a wedge interference filter in accordance with the invention.
Figure 2:
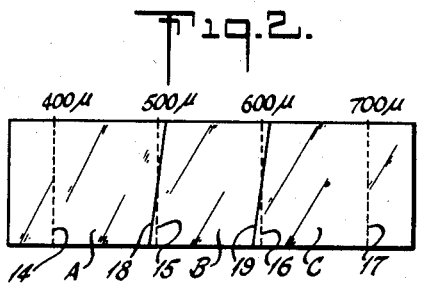
Fig. 2 is a plan view of the filter shown in Fig. 1.

The phenomenon of interference and its application to spectroscopic apparatus is well known but such apparatus is extremely complicated and more or less limited to narrow ranges of operation. This principle is embodied in the wedge interference filter which may consist of a transparent wedge of magnesium fluoride or calcium fluoride with semi-transparent mirrors on each side thereof. This type of filter produces a semi-pure spectrum and as such is satisfactory only for rough spectroscopic application. As is well known, the wavelength of light transmitted through any point of a wedge interference filter is a function of the thickness of the wedge at that point, the relation being $n\lambda = 2\mu\delta \cos r$. Where $\delta$ is the thickness of the wedge at the point under consideration, $\mu$ the index of refraction, $r$ the angle of refraction, $\lambda$ the wavelength and $n$ any integer, preferably small. (See Edser, Light for Students, published by MacMillan Co. Ltd., London, 1920 edition, page 407 or any other elementary textbook on optics). Thus, the same point of the wedge may transmit light of two or more wavelengths provided the product of each wavelength and a small integer is equal, as for example, when one wavelength is a multiple or a submultiple of another. It is this feature of a wedge interference transmission filter which causes the impurity of the spectrum produced thereby and particularly the amount of blue light passed by the thicker red transmitting part of the wedge. I have found that it is possible to improve the purity of the spectrum of a wedge interference filter by permanently adhering to the surface thereof two or more light filters. One method for accomplishing this purification is illustrated in Figs. 1 and 2. The wedge interference filter as shown in these figures consists of an optical wedge denoted by the numeral 10. This wedge is preferably of uniformly increasing thickness from one end to the other and carries on each side a very thin semi-transparent mirrored surface. This structure is then enclosed between glass covers 12 and 13 to protect the wedge as well as the mirrored surfaces. In this embodiment of the invention three different supplementary optical filters each having relatively wide pass bands are used to remove from the spectrum transmitted by the wedge interference filter the undesired light also transmitted by the wedge interference filter and these filters are designated by the letters A, B and C. In the case of an incandescent source, filter A would cover that portion of the wedge interference filter transmitting light between 400 and 500 m$\mu$ and would be preferably a dark toluidine blue. Filter B would cover the region of the wedge filter between 500 to 600 m$\mu$ and should have a relatively flat band pass region between those ranges. Filter C would cover that portion of the wedge filter above 600 m$\mu$ and should be a red filter that is flat at least in the region of the spectrum of 600 to 700 m$\mu$. For other sources of light such as an arc lamp for instance, different filter combinations would be used to secure the desired purification of the spectrum. As illustrated in Fig. 2, it is seen that the reproduced spectrum is substantially linear, the wavelength divisions of the spectrum being designated by the dotted lines 14 to 17 inclusive. The heavy diagonal lines 18 and 19 denote the line of division between adjacent filters. These lines should preferably be at an angle with respect to the spectrum and the magnitude of this angular relationship should be coordinated with the character of the slit with which the wedge interference filter is to be operated. For best results the angle of the lines 18 and 19 should be adjusted so that they are approximately parallel to a diagonal of the slit. With this arrangement a rapid change from one filter to the other when the slit is moved over the spectrum is not encountered and substantially uniform filtering over the entire spectrum is obtained.

Figure 3:
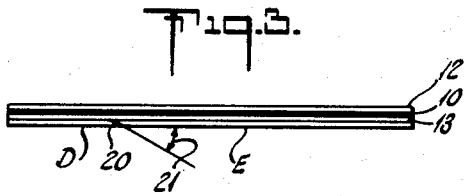
Fig. 3 is an edge view of another embodiment of a wedge interference filter in accordance with the invention.
Figure 4:
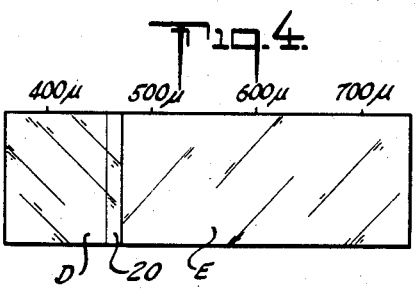
Fig. 4 is a plan view of the embodiment shown in Fig. 3.

Figs. 3 and 4 illustrate another embodiment of the invention. The wedge interference filter of this embodiment, however, is similar to that shown in Fig. 1 and similar numerals have therefore been used to indicate like elements. In this embodiment only two filters D and E are illustrated. These filters, instead of being joined along a diagonal line as previously described, are joined by a tapered lap joint 20 that is substantially parallel to the wavelength lines of the spectrum. For satisfactory results the optimum angle of the joint with respect to the face of the filter, and denoted by the arrow 21, may be about 30°, so that the total width of the lap will slightly exceed the width of the average slit that may be used in cooperation with this filter.

With the structures as described above, a plurality of auxiliary filtering means can be eliminated and a single corrected spectrum producing means is obtained. Each of the wide pass band filters A, B, C, D and E, in effect, purifies the produced spectrum by suppressing light of wavelengths which are multiples or submultiples of the wavelengths in the range desired to be transmitted through the respective underlying part of the wedge.

Fig. 5 illustrates a spectrophotometer in accordance with this invention embodying a wedge interference filter that may include a light correction or purifying means as described in connection with Figs. 1 to 4 inclusive. This embodiment of the invention is particularly adapted for use in producing light of a given wavelength or band of wavelengths for the purpose of analyzing light transmitting substances. It is well known that certain substances and concentration of substances in solution have a very precise light transmission characteristic at a given wavelength, and the presence of a material and its concentration in a solution can be readily detected and quantitatively estimated by this means.

It comprises a suitable light source 30 such as an incandescent lamp or the like, depending upon the particular wavelengths that are desired. This light source may be connected to a battery 31 or other suitable source of electricity through a rheostat 32 to control the brilliance of the light. Behind the lamp 30 is a conventional reflector 33 that will direct the light from the lamp on a pair of condensing lenses 34 and 35 contained within a suitable housing 36. The light from the condensing lenses 34 and 35 is directed onto the wedge interference filter 37, in front of which is a narrow slit 38 for selecting a desired band of wavelengths. For this purpose the wedge interference filter 37 may be mounted so that it can be moved relative to the slit in the selection of the desired wavelengths. It is also preferable in the operation of this device to mount the condensing lenses 34 and 35 so that an image of the filament can be focused on the slit 38 and in this way obtain increased light efficiency. In front of this slit 38 is a second pair of condensing lenses 39 and 40 mounted within a suitable housing 41. These lenses focus the light passing through the slit onto the light sensitive cell 42 that is connected in parallel with a galvanometer 43.

For the purpose of illustrating one of the important uses of equipment of this character, a transparent liquid container 44 is illustrated between the condensing lenses 39, 40 and the voltaic cell 42. The light leaving the condensing lens 40 must therefore pass through the container 44 before arriving at the voltaic cell 42. In normal operations the transparent container 44 is first filled with water or other fluid having known transmission characteristics at the particular wavelength selected for use. This in effect calibrates the instrument. The container 44 is then emptied and is filled with a solution to be examined. The amount of light which passes through the solution can then be measured and compared directly to the reading obtained with a standard or known solution and the presence of a particular substance or its concentration can be readily determined.

It will be noted that in this apparatus no images of the spectrum are formed and only a single slit is required merely for the purpose of isolating a desired band of wavelengths. Inasmuch as image formation has been eliminated, the condensing lenses 34, 35 and 39, 40 need only be simple inexpensive lenses that will produce only an approximate focusing of the light without forming distinct images. With this apparatus conventional light sources may be employed and at the same time obtain a light output sufficient to actuate the light sensitive cell 42 and its galvanometer directly without the aid of additional electronic amplifiers required by conventional equipment. Another advantage of this device is that either a linear or non-linear spectrum can be produced by the wedge interference filter 37 as distinguished from the extremely non-linear spectrum that is an inherent characteristic of prisms.

In order to obtain high optical efficiencies and good image definition with prism type spectroscopic apparatus it is necessary to use fairly large lenses. These lenses are inherently expensive and of course have relatively long focal lengths. With the use of lenses of this character the physical size of the instruments is usually from 30 to 40 inches long. With applicant's invention, however, the apparatus may be relatively small, since long focal length image forming lenses are entirely eliminated and simple condensing lenses of short focal length may be employed as there is no need to form sharply defined images.

This invention also provides for spectroscopic operation in the ultra-violet and infra-red regions of the spectrum as well as in the visible region. For this purpose the wedge interference filter as shown in Figs. 1 and 2 is provided with quartz plates in place of the conventional glass plates 12 and 13 protecting the wedge 10 and its associated mirrored surface. The associated optical elements such as the condensing lenses 34, 35 and 39, 40 must of course be made of a material such as quartz to pass these regions of the spectrum and a suitable source of infra-red or ultra-violet would be used in place of the conventional incandescent lamp 30. The actual characteristic of the wedge 10 and its mirrored surfaces need not be modified in any way as it will separate the infra-red and ultra-violet wavelengths in the same manner at it separates visible wavelengths when visible light is directed on it. Thus with a slight increase in cost through the use of quartz or other suitable material in the optical system of the instrument in accordance with this invention it may be used through a greatly extended range of the spectrum.

I claim:

1. Spectrum producing means comprising a wedge interference filter and at least two different color filters placed side by side and permanently attached to the wedge interference filter, each of said color filters passing light of wavelengths within the range of the spectrum to be produced by the respective underlying part of the wedge interference filter and part of each color filter overlying portions of the wedge interference filter that transmit the same wavelengths.

2. Spectrum producing means according to claim 1 wherein said color filters are joined edgewise one to the other along diagonal lines relative to the spectrum produced by the wedge interference filter.

3. Spectrum producing means according to claim 1 wherein said color filters are joined in tapered overlapping relationship.

4. Spectrum producing means according to claim 1 including a third color filter placed side by side with one of said first mentioned color filters and permanently secured to the wedge interference filter, said third color filter passing light of wavelengths within the range of the spectrum to be produced by the underlying part of the wedge interference filter, said third color filter and the color filter adjacent thereto having parts overlying portions of the wedge interference filter that transmit the same wavelengths.

References Cited in the file of this patent

UNITED STATES PATENTS

| 727,524 | Willsie | May 5, 1903 |
|---|---|---|
| 961,424 | Wallace et al. | June 14, 1910 |
| 1,626,841 | Kelley et al. | May 3, 1927 |
| 1,653,694 | Branson | Dec. 27, 1927 |
| 1,689,258 | Seymour | Oct. 30, 1928 |
| 1,762,143 | Capstaff | June 10, 1930 |
| 1,926,824 | Stogoff | Sept. 12, 1933 |
| 2,051,320 | States | Aug. 18, 1936 |
| 2,152,645 | Holven et al. | Apr. 4, 1939 |
| 2,241,743 | Schoene | May 13, 1941 |
| 2,472,991 | Sukumlyn | June 14, 1949 |

FOREIGN PATENTS

| 716,153 | Germany | Jan. 14, 1942 |

OTHER REFERENCES

"Journal of the Optical Society of America," vol. 38, No. 6, article on pages 483–496, June 1948.

"The British Journal of Photography," June 17, 1949, article on page 276.